(12) United States Patent
Toman

(10) Patent No.: US 8,931,719 B2
(45) Date of Patent: Jan. 13, 2015

(54) FLOTATION DRIVE ASSEMBLY FOR MECHANIZED IRRIGATION SYSTEMS

(75) Inventor: Benjamin J. Toman, Omaha, NE (US)

(73) Assignee: Valmont Industries, Inc., Omaha, NE (US)

( * ) Notice: Subject to any disclaimer, the term of this patent is extended or adjusted under 35 U.S.C. 154(b) by 1168 days.

(21) Appl. No.: 12/313,888

(22) Filed: Nov. 25, 2008

(65) Prior Publication Data

US 2010/0127103 A1    May 27, 2010

(51) Int. Cl.
*B05B 3/00* (2006.01)
*A01G 25/09* (2006.01)

(52) U.S. Cl.
CPC ..................................... *A01G 25/092* (2013.01)
USPC .......................................... 239/728; 239/735

(58) Field of Classification Search
USPC .................. 239/735, 722, 723, 726, 728, 729
See application file for complete search history.

(56) References Cited

U.S. PATENT DOCUMENTS

| 3,954,120 | A  | * | 5/1976  | Zimmerer et al. | 239/728 |
| 4,693,425 | A  | * | 9/1987  | Meis et al.     | 239/735 |
| 6,616,374 | B2 | * | 9/2003  | Starr           | 405/36  |
| 7,311,275 | B2 |   | 12/2007 | Korus           |         |
| 2007/0131806 | A1 |   | 6/2007 | Starr           |         |

* cited by examiner

*Primary Examiner* — Christopher Kim
(74) *Attorney, Agent, or Firm* — David H. Milligan, PC LLO

(57) ABSTRACT

A flotation drive assembly for mechanized irrigation systems such as a corner pivot irrigation machine, a center pivot irrigation machine or a linear move irrigation machine wherein the flotation drive assembly improves upon the field traction of the mechanized agricultural irrigational systems and which improves the resistance to wheel track rutting that may occur during the normal operation of the systems. The flotation drive assembly of this invention is designed so that the gearbox which drives the wheel/tire assemblies at the opposite ends of the main frame of the drive unit or tower is mounted so as not to support the weight of the tower or the water contained therein.

6 Claims, 8 Drawing Sheets

FLOTATION DRIVE ASSEMBLY FOR MECHANIZED IRRIGATION SYSTEMS

BACKGROUND OF THE INVENTION

1. Field of the Invention

This invention relates to a drive assembly for mechanized irrigation systems and more particularly to a flotation drive assembly for a mechanized irrigation system such as a corner pivot irrigation system, a center pivot irrigation system, or a linear move irrigation system. More particularly, this invention relates to a flotation drive assembly for mechanized irrigation systems which improves the field traction of the systems and which improves the resistance to wheel track rutting that may occur during the normal operation of the irrigation system. Even more particularly, this invention relates to a flotation drive assembly for mechanized irrigation systems wherein the gearboxes associated therewith do not support the weight of the system.

2. Description of the Related Art

Mechanized agricultural irrigation systems such as a corner pivot irrigation system, a center pivot irrigation system or a linear move irrigation system typically include a water delivery pipeline which is supported by a plurality of structural steel towers or drive units. The towers or drive units usually have at least two wheel/tire assemblies associated therewith which contact the ground and support a substantial percentage of the total weight of the system. The wheel/tire assemblies are usually mounted to a gearbox, which itself is mounted to the tower. The gearbox therefore experiences a significant overhung load due to the cantilevered arrangement of the wheel/tire assembly. When this setup is used with a wheel/tire assembly of a larger than average width, the overhung load becomes too large for current gearboxes to withstand and they eventually fail.

The need for a wider than normal traction contact patch arises from the significant rutting and traction problems that occur mainly in potato and sugar beet fields, however these problems do occur in other field situations as well. Past trials with gearbox arrangements using wider than average, or flotation, wheel/tire combinations have demonstrated large forces on the gearbox which have resulted in output shaft, flange, bearing and mounting failures. Such issues must be addressed before any flotation options may be utilized.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A flotation drive assembly for mechanized irrigation systems such as corner irrigation systems, center pivot irrigation systems or linear move irrigation systems. In all of the irrigation systems described above, a water pipeline is supported upon a plurality of spaced-apart drive towers or drive units. In the instant invention, a pair of wheel/tire assemblies are rotatably geared to the towers for driving the towers and the water pipeline over the area to be irrigated. A pair of spaced-apart support frames are secured to the associated drive tower with the support frames having first and second sides. A wheel/tire assembly is rotatably secured to each of the support frames so as to be positioned at one side of the associated support frame. Each of the wheel/tire assemblies include a drive axle. A motor driven gearbox is secured to each of the support frames so as to be positioned at the other side of the associated support frame in a cantilevered manner. Each of the motor driven gearboxes are operatively connected to the drive axle of the associated wheel/tire assembly to rotate the same without the associated gearbox supporting the weight of the associated drive tower.

It is therefore a principal object of the invention to provide an improved flotation drive assembly for mechanized irrigation systems such as corner pivot irrigation systems, center pivot irrigation systems and linear move irrigation systems.

A further object of the invention is to provide an improved mounting means which enables the utilization of wide flotation wheel/tire combinations on existing irrigation drive towers or drive units.

A further object of the invention is to provide a flotation drive assembly for mechanized irrigation systems wherein the gearbox for the drive wheels thereof are mounted outside the structure of the drive unit or tower and which does not support the weight of the steel tower structure or the water contained therein.

It is a further object of the invention to provide a flotation drive assembly for mechanized irrigation systems which improves the field traction of the irrigation system and which improves the resistance to wheel track rutting that may occur during the normal operation of the irrigation system.

Still another object of the invention is to provide a flotation drive assembly for mechanized irrigation systems which allows the use of wide flotation wheel/tire combinations with little or no additional wear on the gearbox or tower itself.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention.

However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
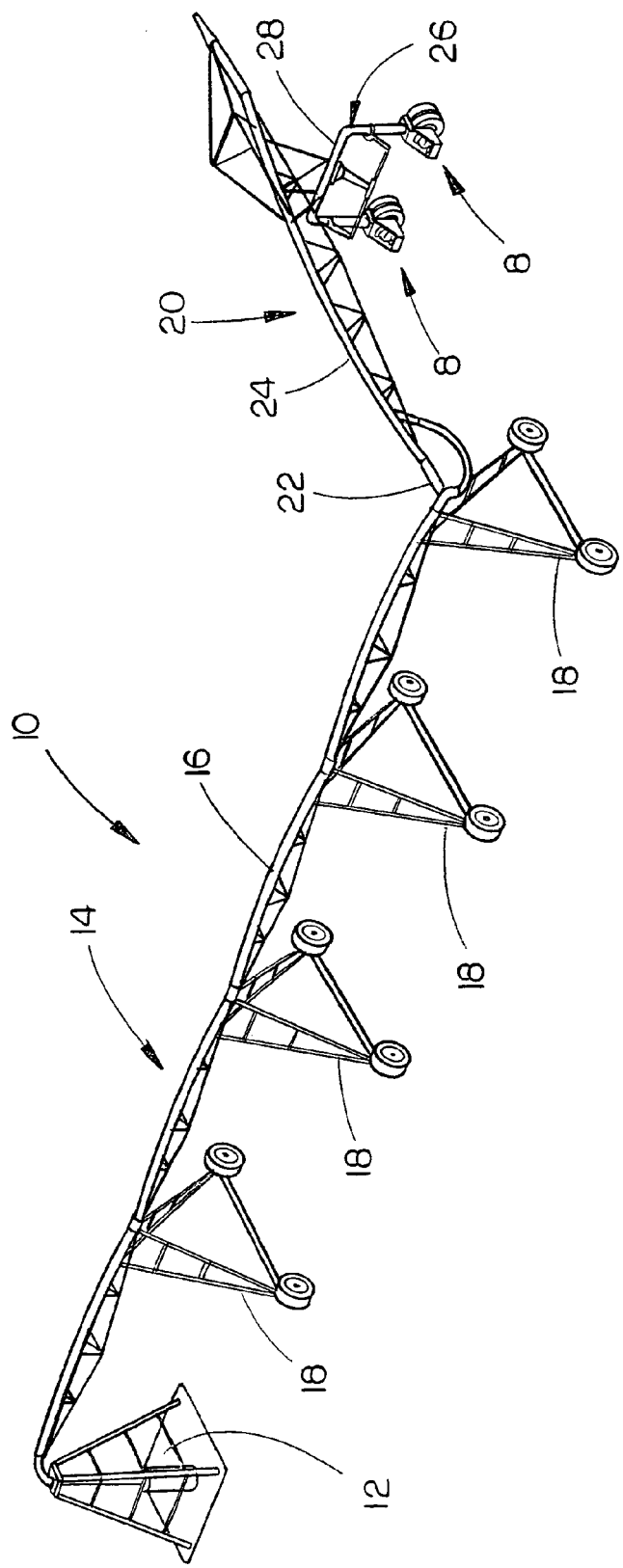
FIG. 1 is a perspective view of a corner irrigation system having the flotation drive assembly of this invention mounted on the drive wheels of the corner tower.
Figure 2:
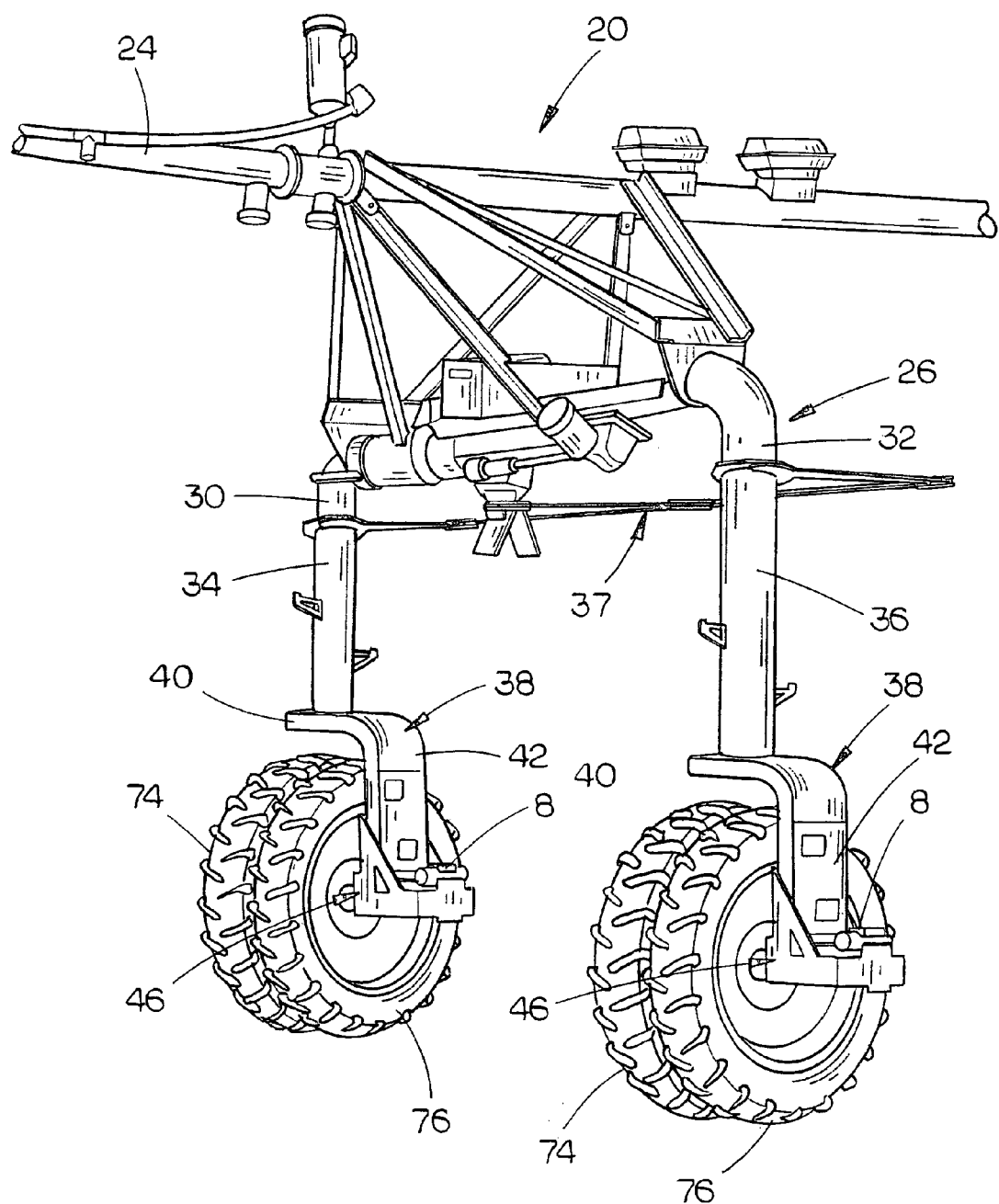
FIG. 2 is a perspective view of the tower for the corner irrigation system of FIG. 1 having the flotation drive assemblies of this invention mounted thereon.
Figure 3:
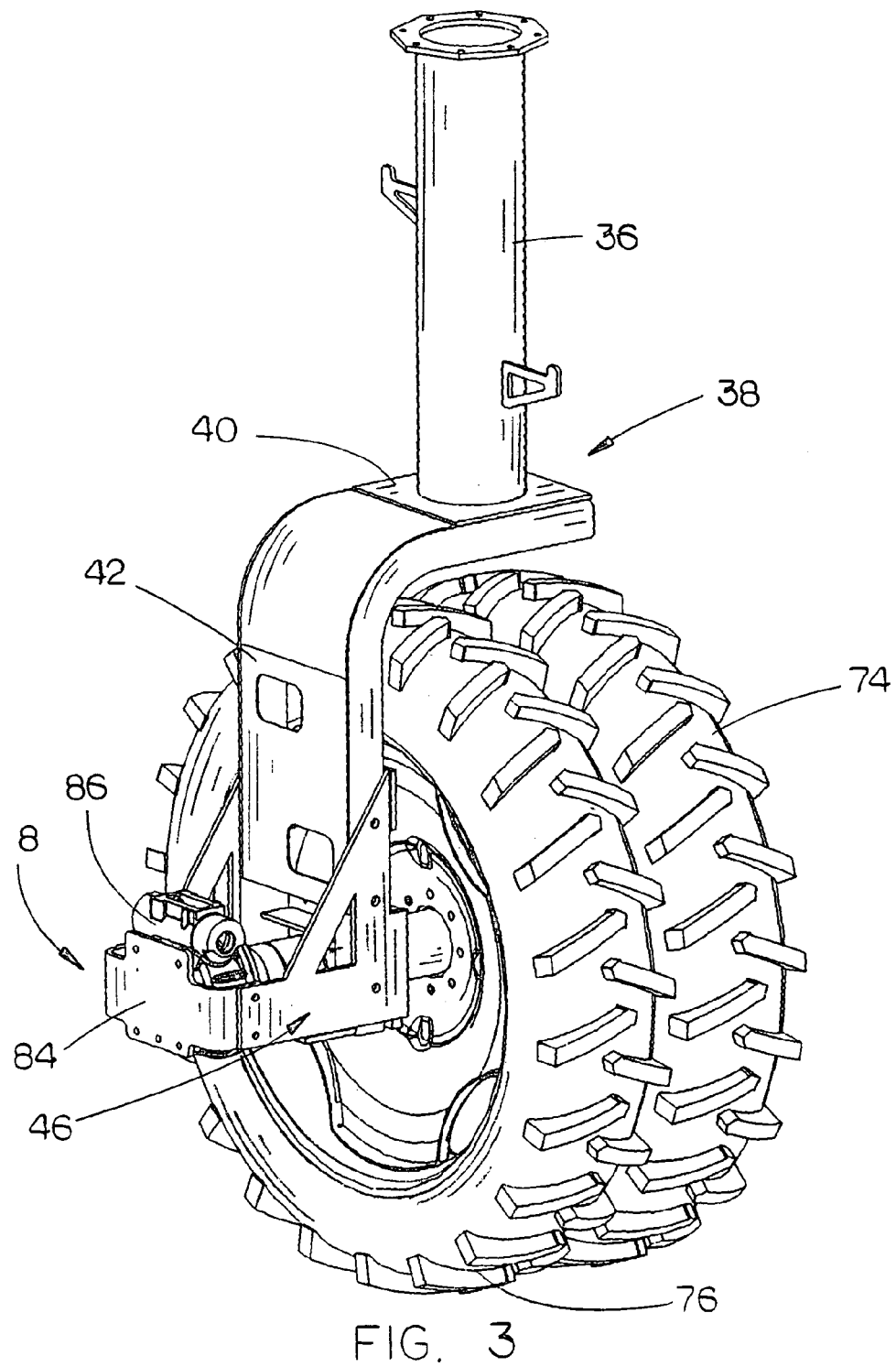
FIG. 3 is a perspective view of one of the flotation drive assemblies mounted on a pair of dual wheels.
Figure 6:
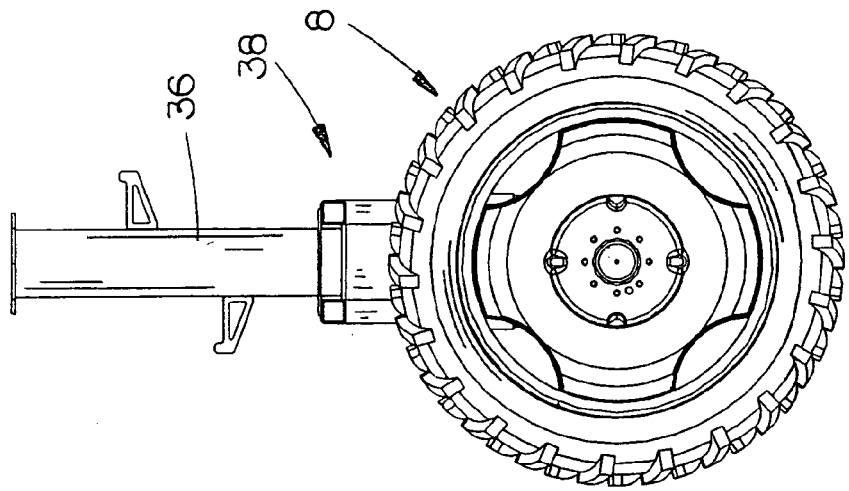
FIG. 6 is a side view of the assembly of FIG. 3.
Figure 5:
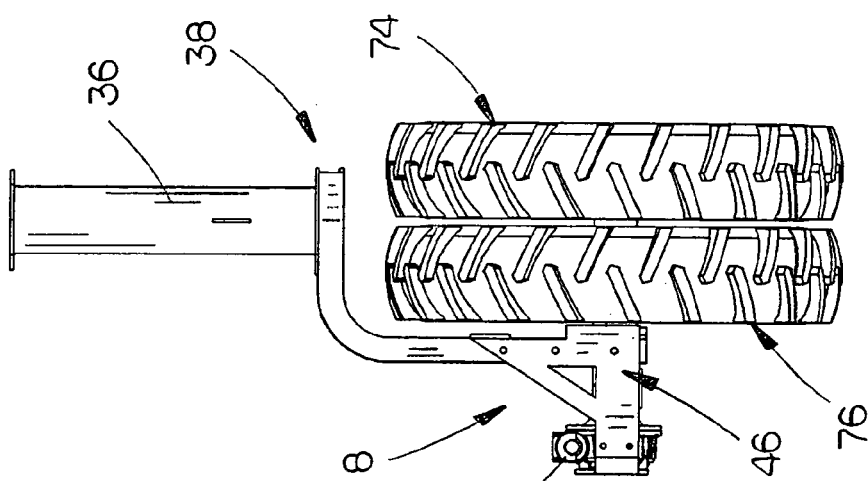
FIG. 5 is an end view of the assembly of FIG. 3.
Figure 4:
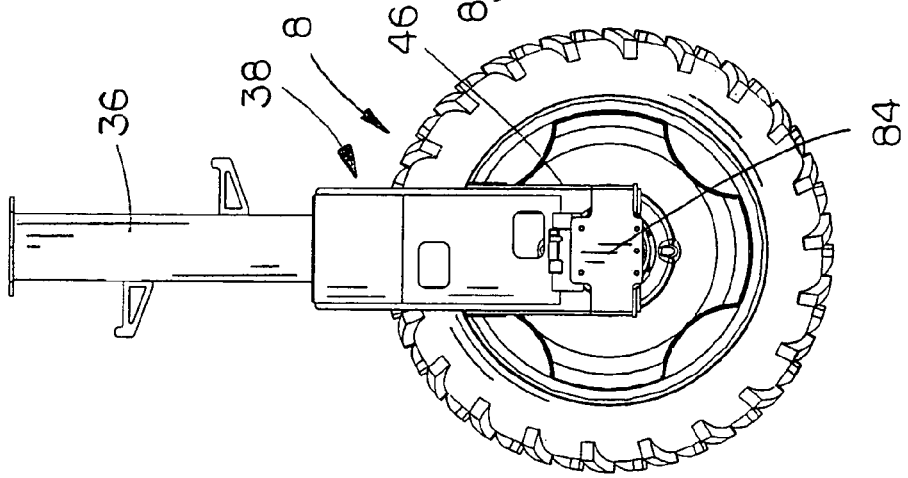
FIG. 4 is a side view of the assembly of FIG. 3.
Figure 7:
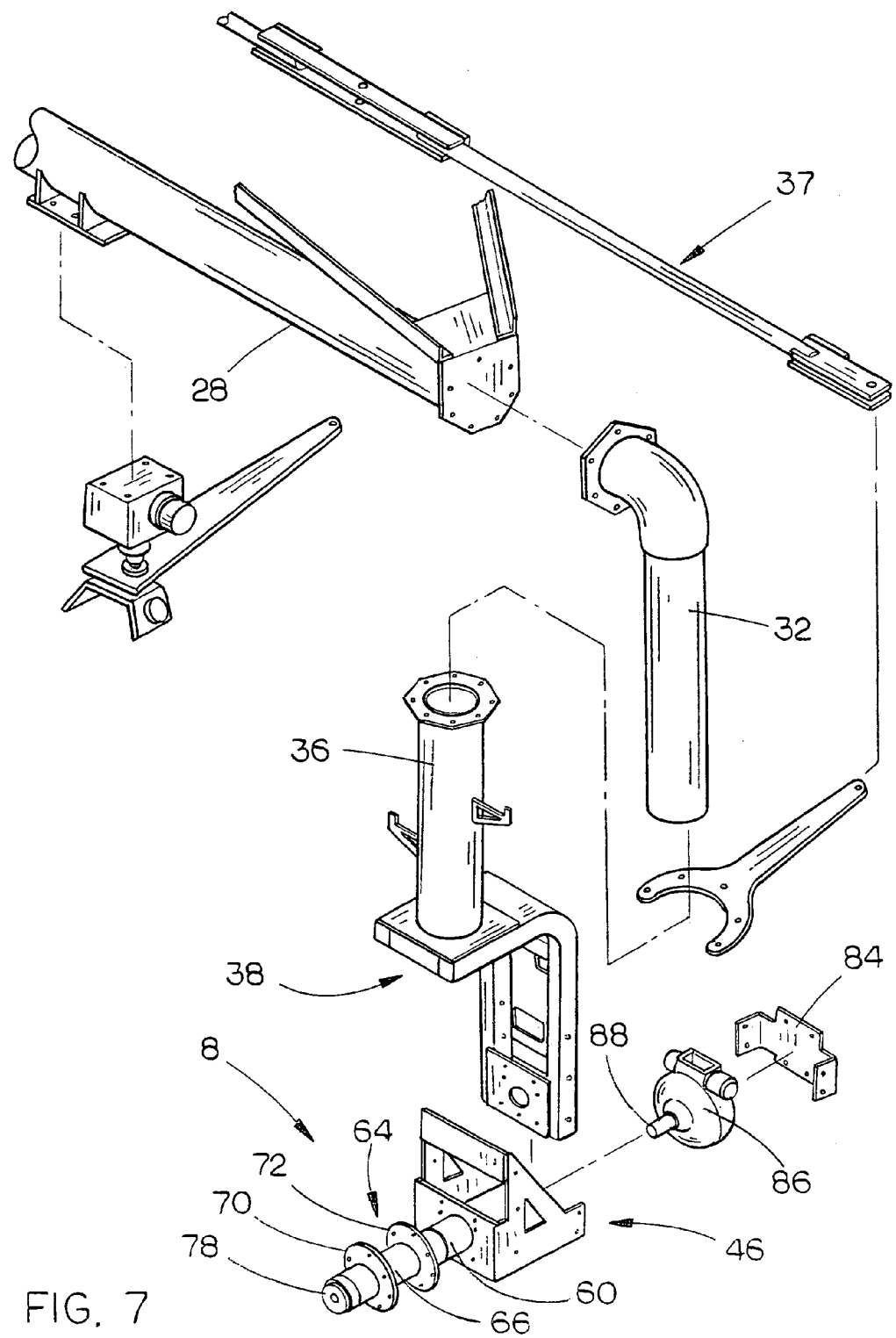
FIG. 7 is an exploded perspective view of the drive assembly of this invention and its related structure on a corner irrigation system.

The flotation drive assembly of this invention is referred to by the reference numeral 8 and is designed to be used with a mechanized or mobile irrigation system such as the system 10 (FIG. 1) which is commonly referred to as a corner pivot irrigation system. The assembly 8 of this invention may also be used on a center pivot irrigation system or a linear irrigation system. The assembly 8 may be mounted on some or all of the drive towers of the irrigation system. In FIG. 1, the system 10 includes a center pivot structure 12 having a main arm 14 extending outwardly therefrom. The main arm comprises a water conduit or pipeline 16 supported upon a plurality of non-steerable drive towers 18. Corner arm 20 is pivotally connected to the outer end of main arm 14 at 22 in conventional fashion and comprises a water conduit or pipe 24 which is supported upon a steerable drive tower 26 in conventional fashion.

As seen, the steerable drive tower 26 includes a main beam 28 having opposite ends. The beam 28 may be disposed at a right angle to the longitudinal axis of the pipe 24 or at some other angle with respect thereto as is common in most corner pivot irrigation machines. A pair of tubular supports 30 and 32 are secured to the opposite ends of main beam 28 with the lower ends thereof rotatably receiving vertically disposed pipes 34 and 36 therein respectively, such as disclosed in U.S. Pat. No. 6,039,273. The pipes 34 and 36 are connected together and are rotated in unison by a steering mechanism 37 of conventional construction.

Figure 8:
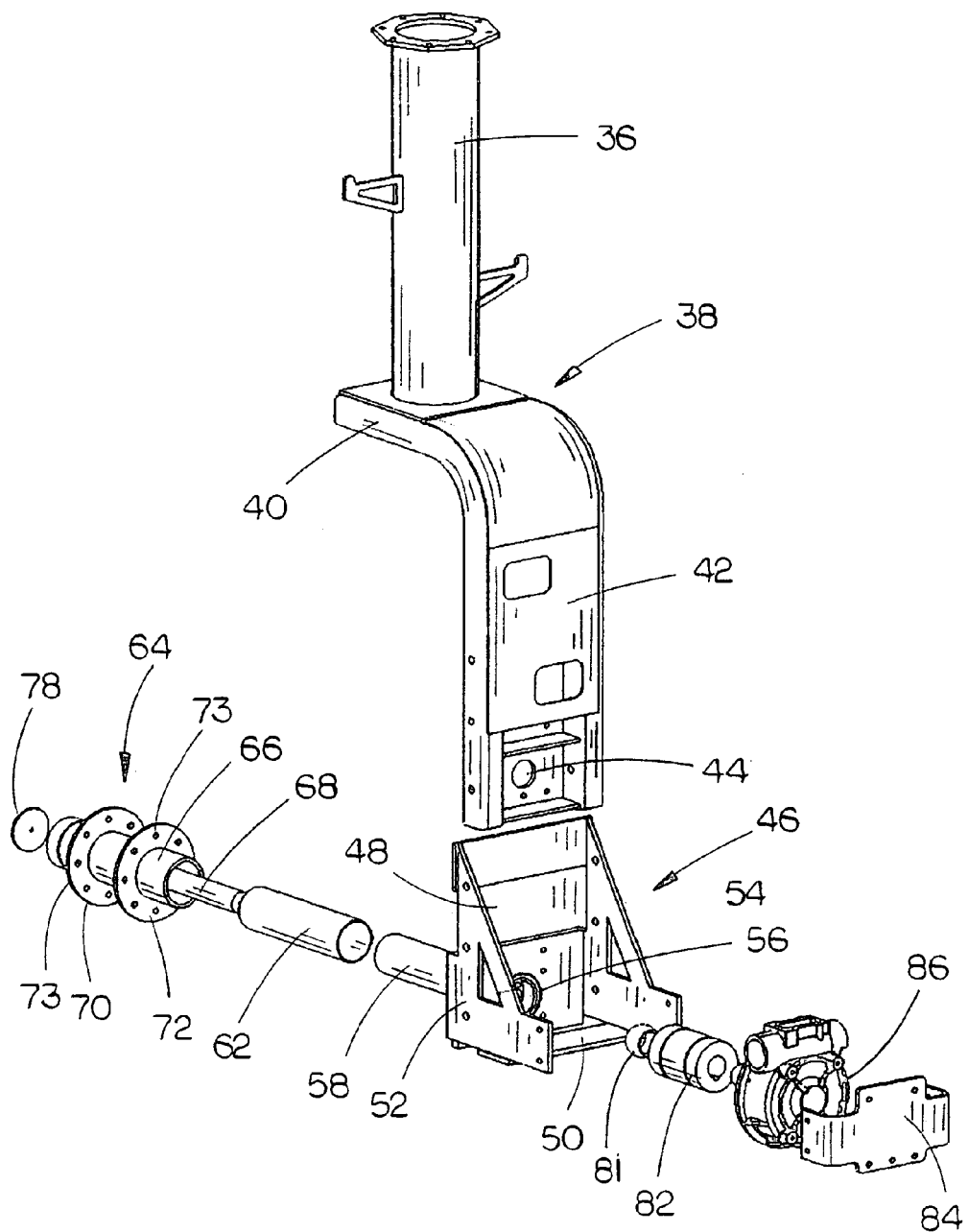
FIG. 8 is an exploded perspective view of the flotation drive assembly of this invention as utilized with a corner irrigation system.

An assembly 8 is secured to the lower ends of each of pipes 34 and 36. Inasmuch as the assemblies are identical, only one of the assemblies 8 will be shown and described in detail. The numeral 38 refers to an inverted L-shaped support having an upper leg 40 and a lower leg 42. The free end of leg 40 is welded to the lower end of pipe 38 for rotation therewith. The lower end of leg 42 is provided with an opening 44 formed therein (FIG. 8).

Figure 9:
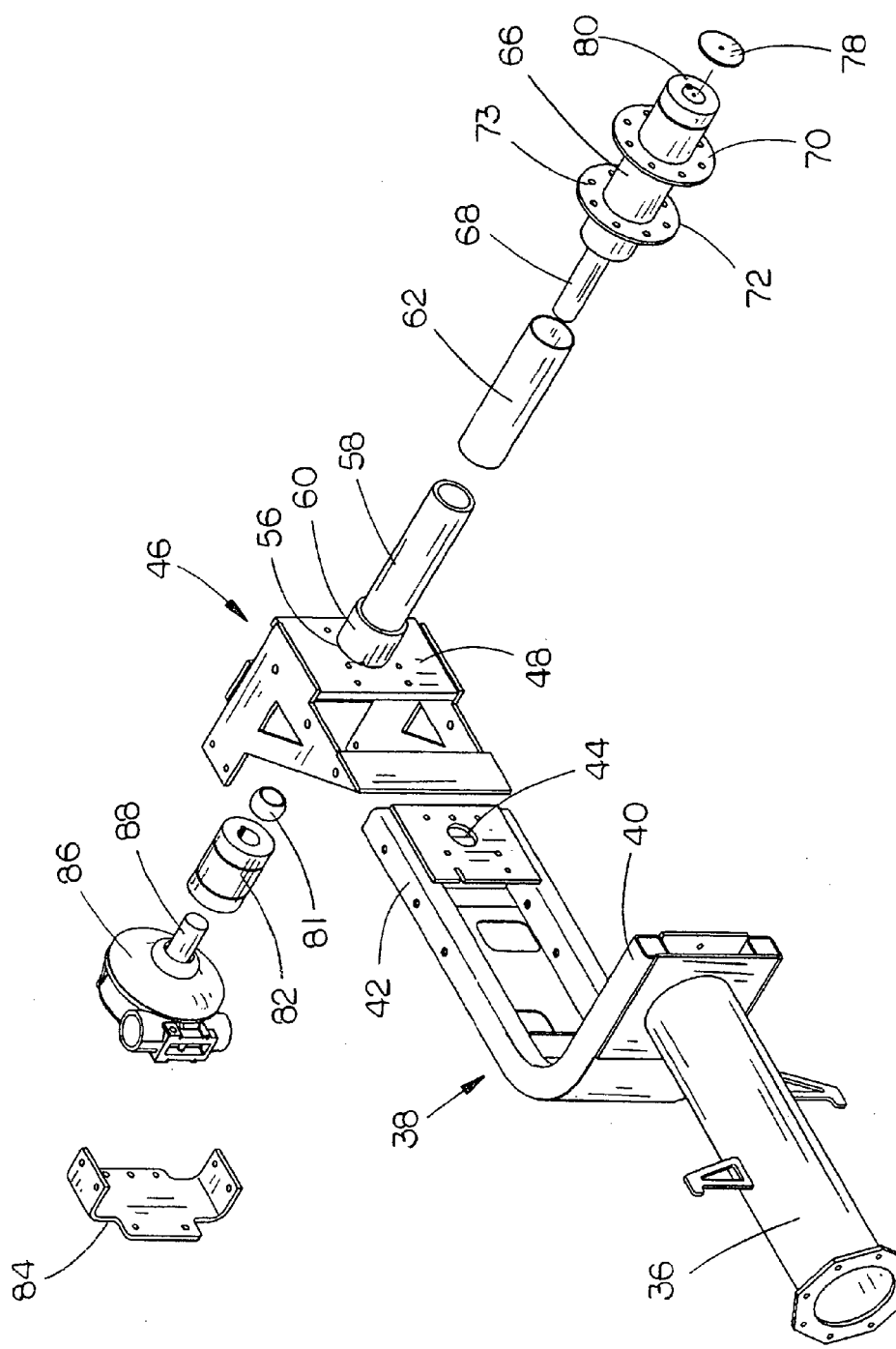
FIG. 9 is a further exploded perspective view of the structure of FIG. 8.
Figure 10:
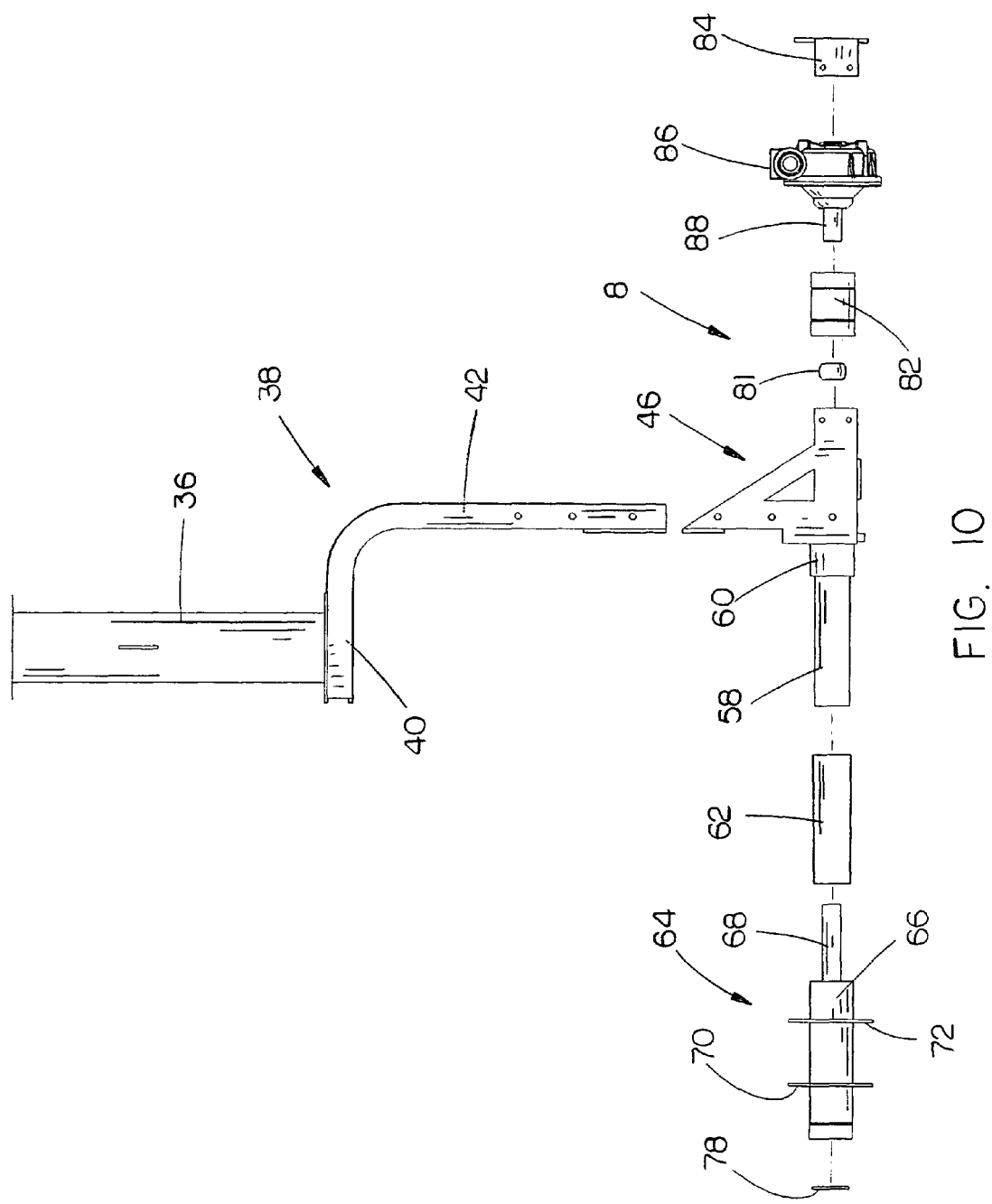
FIG. 10 is a side exploded view of the structure of FIG. 8.

The numeral 46 refers to a support frame having a generally vertically disposed wall 48, a generally horizontally disposed bottom wall 50 and side walls 52 and 54. The lower end of wall 48 is provided with an opening 56 formed therein (FIG. 8). Frame 46 also includes a hollow tube 58, one end of which is welded to one side of wall 48, the interior of which communicates with opening 56. Preferably, the inner end of tube 58 is received by a supporting hub 60 which is also welded to wall 48. The numeral 62 refers to a tubular sleeve bearing which is adapted to be slidably mounted on tube 58 as will be described in more detail hereinafter. The numeral 64 refers to a drive shaft assembly including an outer tube or pipe 66 which has the drive shaft 68 received therein in a fixed manner and which extends therefrom. A pair of spaced-apart circular flanges 70 and 72 are welded to tube 66 and have radially spaced bolt openings 73 formed therein which are adapted to receive bolts therein to secure the tire/wheel assemblies 74 and 76 thereto. The numeral 78 refers to a safety cap. The outer end of drive shaft 68 is tapped at 80 (FIG. 9) so as to receive a bolt therein which extends through cap 78 to secure cap 78 to drive shaft 68 so as to be positioned adjacent the outer end of tube 66.

To assemble the parts just described, the preferred manner of assembly is to first slip sleeve bearing 62 onto tube 58 as far as possible. Once sleeve bearing 62 has been mounted on tube 58, the drive shaft assembly 64 is slid onto sleeve bearing 62 with the drive shaft 68 being received by sleeve bearing 62 and tube 58 so that the end of drive shaft 68 extends opening 56 in wall 48 and through opening 44 in portion 42 of support 38. After the drive shaft 68 has been inserted as far at it will go, the safety cap 78 is secured to the end of shaft 68.

A spherical bearing 81 is then slid onto the protruding end of the drive shaft 68 and slid onto the frame 46. A rigid shaft coupler 82 is then slid onto the drive shaft 68 with a shaft key and attached to the drive shaft with set screws. A gearbox mounting plate 84 is then secured to the gearbox 86 with the gearbox output shaft 88 then being inserted into the rigid shaft coupler 82. The set screws in the coupler 82 are then tightened, and gearbox mounting plate bolts are then utilized to attach the gearbox mounting plate 84 to the frame 46.

Depending upon the arrangement of the wheel/tire combination, the wheel/tire(s) may need to be installed at a certain point in the steps listed above. This does not, however, affect the order in which the other components will be installed relative to each other. The steps described above may be different if the structure is installed on a tower different than that of a corner pivot irrigation machine. The general layout and quantities of the components will remain the same though, as the concept is adaptable to different varieties of mechanized irrigation drive unit towers.

It can be seen that the unique structure described above enables the gearbox 86 to be secured to the drive shaft 68 by way of the rigid coupler 82 which transmits all torque created by the gearbox in an efficient manner. In the arrangement described above, the gearbox 86 is mounted outside the structure of the tower and does not support the weight of the drive tower or the water contained in the pipeline. All reaction forces are transferred into the tower by way of the sleeve bearing 62 and drive shaft assembly 64. This permits the use of wide flotation wheel and tire combination with little or no additional wear on the gearbox or tower itself.

It can therefore be seen that the invention accomplishes at least all of the stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. An irrigation system comprising:
   a water pipeline supported upon a plurality of spaced-apart drive towers;
   each of said drive towers having an elongated main beam with opposite ends;
   at least one of said drive towers having a support frame fixed to each of the ends of said main beam, said support frame having a first side and a second side;
   a support structure coupled to said first side of each of said support frames;
   a sleeve bearing coupled to each of said support structures;
   a wheel/tire assembly rotatably secured to each of said support frames, each of said wheel/tire assemblies positioned at said first side of the associated said support frame, each of said wheel/tire assemblies including a drive shaft extending through the associated said support structure and the associated said sleeve bearing, said drive shaft having a first end and a second end;
   a motor driven gearbox operatively secured to each of said support frames;

each of said motor driven gearboxes operatively connected to said second end of said drive shaft of the associated said wheel/tire assembly to rotate the same, wherein at least a portion of the reactionary forces are transferred by way of each said sleeve bearing to the associated said drive tower; and a sleeve bearing configured to receive said drive shaft, said sleeve bearing coupled to said first side of said support frame, wherein at least substantially all reaction forces are transferred into at least one drive tower of said plurality of drive towers via said sleeve bearing and said drive shaft, and wherein said first end of each of said drive shaft is received by an outer tube, each said outer tube including at least one flange for supporting a wheel/tire, wherein each said sleeve bearing is configured to slidably receive the associated said outer tube over the associated said sleeve bearing, and wherein said wheel/tire assembly is supported in a cantilever fashion.

2. An irrigation system comprising:

a main arm assembly including a first portion of a pipeline supported upon a plurality of non-steerable drive towers, the main arm assembly having an outer end;

a corner arm assembly including a second portion of the pipeline supported upon a steerable drive tower, the corner arm assembly pivotally coupled to the outer end of the main arm assembly, the steerable drive tower including:

an elongated beam having a first end and a second end;

a first support structure secured to the first end;

a second support structure secured to the second end;

a first support frame fixably attached to the first support structure, the first support frame having a first side and a second side;

a second support frame fixably attached to the second support structure, the second support frame having a first side and a second side;

a first hollow tube structure coupled to the first side of the first support frame;

a second hollow tube structure coupled to the first side of the second support frame;

a first sleeve bearing coupled to the first hollow tube structure;

a second sleeve bearing coupled to the second hollow tube structure;

a first wheel assembly rotatably secured to the first support frame, the first wheel assembly positioned at the first side of the first support frame and having a first drive shaft extending through the first sleeve bearing and the first hollow tube structure;

a second wheel assembly rotatably secured to the second support frame, the second wheel assembly positioned at the first side of the second support frame and having a second drive shaft extending through the second sleeve bearing and the second hollow tube structure;

a first gearbox operatively connected to the first drive shaft of the first wheel assembly configured to rotate the same; and a second gearbox operatively connected to the second drive shaft of the second wheel assembly configured to rotate the same.

3. The irrigation system as recited in claim 2, wherein at least substantially all reactionary forces associated with the first wheel assembly are transferred through the first sleeve bearing to the drive tower and at least substantially all reactionary forces associated with the second wheel assembly are transferred through the second sleeve bearing to the drive tower, and wherein the first drive shaft experiences no reactionary forces beyond torque forces generated from the first gearbox and the second drive shaft experiences no reactionary forces beyond torque forces generated from the second gearbox.

4. The irrigation system as recited in claim 2, wherein the first wheel assembly further includes a first tube structure configured to at least partially receive at least one wheel and the second wheel assembly further includes a second tube structure configured to at least partially receive at least one wheel, the first tube structure having the first drive shaft extending therefrom, the second tube structure having the second drive shaft extending therefrom, wherein the first sleeve bearing is at least partially received by the first tube structure and the second sleeve bearing is at least partially received by the second tube structure.

5. The irrigation system as recited in claim 2, wherein the first support structure is an inverted L-shaped support structure and the second support structure is an inverted L-shaped support structure.

6. The irrigation system as recited in claim 2, further comprising: a first outer tube including a first flange for supporting a tire coupled to an outer surface of the first outer tube, the first outer tube slidably coupled to the first sleeve bearing; a second outer tube including a second flange for supporting a tire coupled to an outer surface of the second outer tube, the second outer tube slidably coupled to the second sleeve bearing, wherein the first drive shaft is received by the first outer tube and the second drive shaft is received by the second outer tube.

* * * * *